(No Model.)

E. KEUSER.
ROCKING HORSE.

No. 479,370. Patented July 19, 1892.

WITNESSES:
P. H. Chagles.
L. Douville.

INVENTOR
Emanuel Keuser
BY John A. Wiedersheim.
ATTORNEY.

UNITED STATES PATENT OFFICE.

EMANUEL KEUSER, OF PHILADELPHIA, PENNSYLVANIA, ASSIGNOR TO MARY KEUSER, OF SAME PLACE.

ROCKING-HORSE.

SPECIFICATION forming part of Letters Patent No. 479,370, dated July 19, 1892.

Application filed March 3, 1892. Serial No. 423,654. (No model.)

*To all whom it may concern:*

Be it known that I, EMANUEL KEUSER, a citizen of Switzerland, having resided one year last past in the United States and declared my intention of becoming a citizen thereof, residing in the city and county of Philadelphia, State of Pennsylvania, have invented a new and useful Improvement in Rocking-Horses, which improvement is fully set forth in the following specification and accompanying drawings.

My invention relates to improvements in rocking-horses; and it consists of a truck or running-gear having a body secured thereto, said body being connected with pulleys which are on the rear axle of the truck, said pulley having pawls, which engage with ratchets fastened to the rear axle, whereby when the body is rocked a continuous forward movement is imparted to the device.

Figure 1:
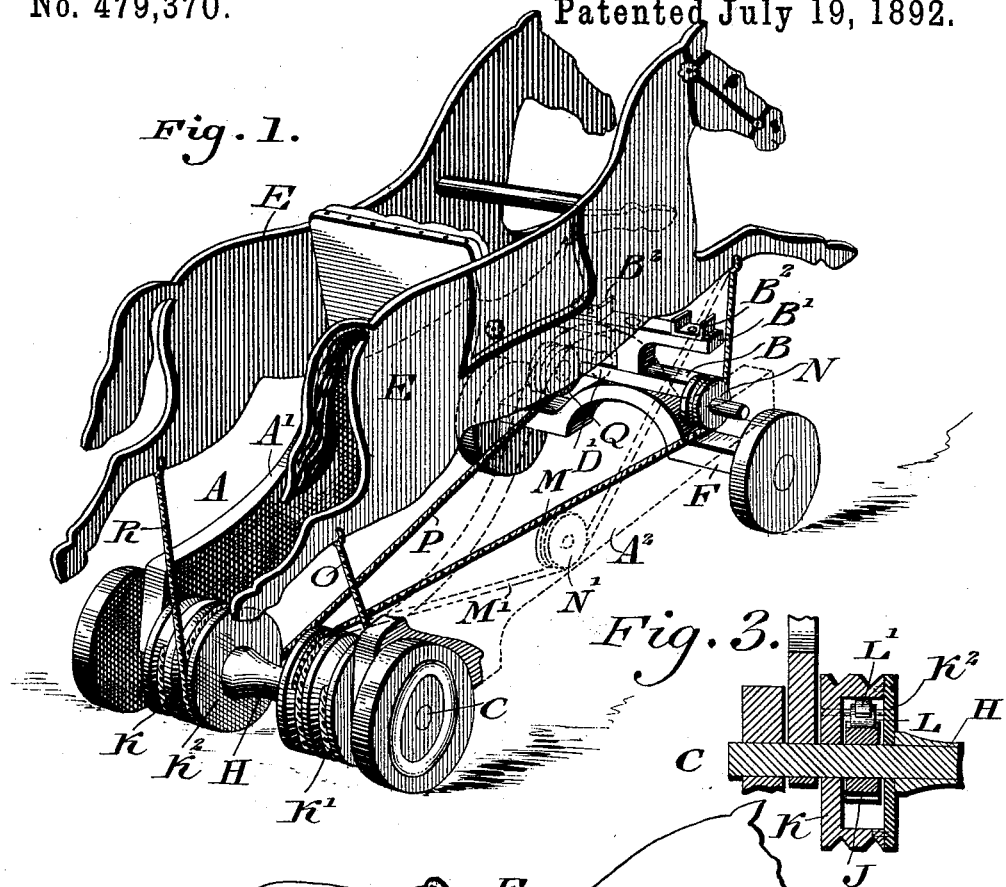
Figure 3:
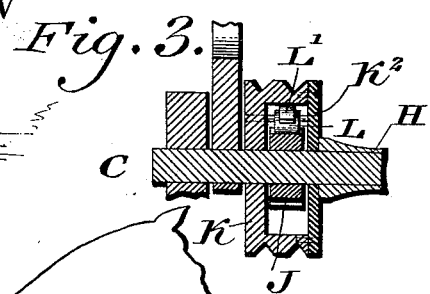
Figure 2:
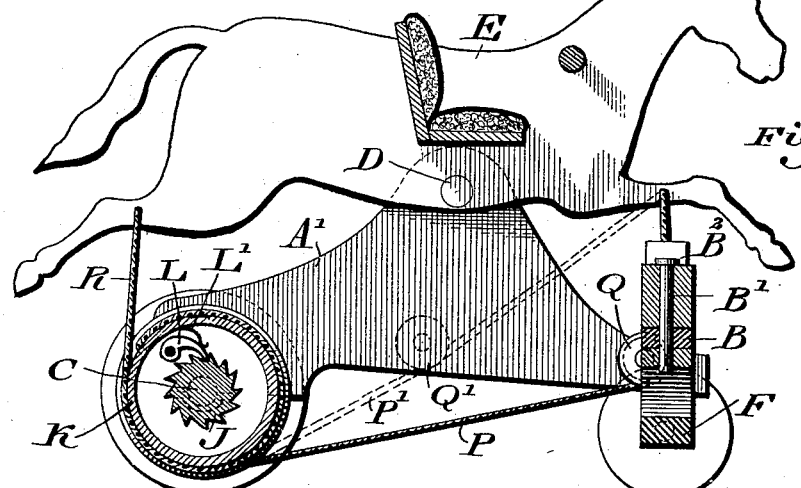

Figure 1 represents a perspective view of the rocking-horse with one reach of the truck broken away. Fig. 2 represents a section showing the ratchet and pawl. Fig. 3 represents a section of the pulleys, showing position of ratchet and pawl.

Similar letters of reference indicate corresponding parts in the several figures.

Referring to the drawings, A designates a truck, and A' A² the reaches thereof, which are connected in front by the cross-piece B and in the rear by the axle C, which is journaled thereon between the wheels and the pulley. At suitable points D D' is pivoted the body E, in which is the seat. The front axle F is fastened to a pivot which passes through the cross-piece B and is secured to the steering device. The latter consists of the bar B', to which the foot-rests B² B² are pivotally secured, whereby the bar may be turned; but the rests B² B² will always have the same position.

Secured to the rear axle C is a sleeve H, which serves to keep the pulleys K K' apart. Near each end of the sleeve a ratchet J is secured to the axle C. Completely surrounding the ratchets J are the grooved pulleys K K', both of said pulleys being provided with an aperture, in which the ratchets work. Plates K² close said apertures. Pivoted between the side of the pulley and the plate is a pawl L. Secured to the inner face of the pulleys are springs L', whose other ends are secured to the pawls, thus forcing said pawls into engagement with the ratchets. Fastened to the front of one side of the body is the cord or strap M, which moves around the pulley N and after passing in one of the grooves around the pulley K' is secured thereto. Fastened to the rear of said body is a cord or strap O, which passes around the other groove of the pulley K' in an opposite direction from the cord M and is also secured to said pulley. By this means when the body is rocked the cords will revolve the pulley K', the cord M pulling it in one direction and the cord O in the opposite. The pawl in the pulley K' is so fixed as to engage the ratchet on the forward revolution of the pulley, and the latter thus freely revolves in the reverse direction. Cords are secured to the front and rear ends, respectively, of the other side of the body E, the cord P moving on the pulley Q and passing around the pulley K in the reverse direction to that in which the cord M passes around the pulley K', the cord R in a reverse direction from that of the cord O, the said cords P and R acting in a reverse direction to each other. Both are secured to the pulley K. The pawl L acts in the same manner as the pawl of pulley K'. When the body is in motion and the front is moving up, there is a pull on the front cords M and P. The same being secured to the pulleys causes the latter to revolve in opposite directions. The rear cords O and R are drawn around the pulleys. As the pulley K' revolves forward the pawl engages with the teeth of the ratchet, and thus forces the ratchet around in the same direction as that in which the pulley is revolving. The said ratchet being secured to the axle C causes it to revolve, and in consequence the wheels. The truck is thus moved forward. The pawl in the pulley K passes over the teeth of the ratchet J. When the rocking motion places the body in a reverse position—that is, when the rear end of the body is up—the cords cause the pulleys to revolve in an opposite direction from their previous revolution. The rear cords O and R pull on the pulleys, causing the pulley K to revolve forward, and the pawl L, engaging the teeth of the ratchet, forces the axle and wheel around and imparts a forward motion to the device, the pawl in the other pulley passing over the teeth. By this means a continuous forward motion is imparted to the device when the body is in use.

In place of the cords I may use straps or other suitable material. I may also make the sleeve and ratchets of one piece and fasten them to the axle. The position of the pulleys N and Q may be varied, as desired.

Having thus described my invention, what I claim as new, and desire to secure by Letters Patent, is—

1. A rocking-horse mounted on a truck and having cords secured to the body of said horse and passing in reverse direction around pulleys on the axle of the truck, ratchets secured to said axle, and said pulleys carrying pawls which engage with said ratchets, substantially as described.

2. A rocking-horse mounted on a truck having ratchets secured to the axle, and pulleys which surround the ratchets, carrying pawls which engage said ratchets, and cords secured to the body of the horse and passing in reverse direction around the said pulleys, substantially as described.

3. A rocking-horse having a truck with a front cross-piece and a rear axle, a body pivoted to said truck, pulleys on the front cross-piece and pulleys on the rear axle, and cords attached to the front of the body and passing around the pulleys on the front cross-pieces and in reverse direction around pulleys on the rear axle, substantially as described.

4. A rocking-horse having a truck with a front cross-piece and running-wheels and a rear axle with running-wheels, pulleys loosely mounted on said axle and cross-piece, ratchets secured to the axles, and pawls engaging said ratchets, and cords secured to the opposite ends of the body of the horse and passing in reverse direction around the pulleys on said rear axle, said parts being combined whereby continuous forward motion is imparted to said rocking-horse, substantially as described.

EMANUEL KEUSER.

Witnesses:
JOHN A. WIEDERSHEIM,
WM. C. WIEDERSHEIM.